US008937893B1

(12) United States Patent
Nemavat

(10) Patent No.: US 8,937,893 B1
(45) Date of Patent: Jan. 20, 2015

(54) METHOD AND APPARATUS FOR DELAYING WIRELESS MESSAGE TRANSMISSION FOR SAVING POWER

(75) Inventor: Pradeep Jugraj Nemavat, Pune (IN)

(73) Assignee: Marvell International Ltd., Hamilton (BM)

( * ) Notice: Subject to any disclaimer, the term of this patent is extended or adjusted under 35 U.S.C. 154(b) by 249 days.

(21) Appl. No.: 13/218,495

(22) Filed: Aug. 26, 2011

Related U.S. Application Data

(60) Provisional application No. 61/382,406, filed on Sep. 13, 2010.

(51) Int. Cl.
H04W 84/12 (2009.01)
H04W 52/02 (2009.01)
H04W 88/08 (2009.01)

(52) U.S. Cl.
USPC .......................................... 370/311; 370/310

(58) Field of Classification Search
None
See application file for complete search history.

(56) References Cited

U.S. PATENT DOCUMENTS

| 2004/0072559 | A1* | 4/2004 | Kakumaru et al. | 455/422.1 |
| 2004/0151149 | A1* | 8/2004 | Song et al. | 370/338 |
| 2005/0047382 | A1* | 3/2005 | Park et al. | 370/338 |
| 2005/0221869 | A1* | 10/2005 | Liu et al. | 455/574 |
| 2007/0008922 | A1* | 1/2007 | Abhishek et al. | 370/329 |
| 2007/0133479 | A1* | 6/2007 | Montojo et al. | 370/335 |
| 2007/0248034 | A1* | 10/2007 | Hsu et al. | 370/318 |
| 2008/0219228 | A1* | 9/2008 | Seok et al. | 370/338 |
| 2011/0103264 | A1* | 5/2011 | Wentink | 370/255 |
| 2011/0158188 | A1* | 6/2011 | Womack et al. | 370/329 |
| 2013/0064152 | A1* | 3/2013 | Seok | 370/311 |

OTHER PUBLICATIONS

IEEE P802.11z Extensions to Direct Link Setup (DLS) comments; Jul. 16, 2009 (3 pages).
IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 1: Radio Resource Measurement of Wireless LANs; Copyright © 2008 by the Institute of Electrical and Electronics Engineers, Inc.; Jun. 12, 2008 (244 pages).
International Standard Information technology—Telecommunications and information exchange between systems—Local and metropolitan area networks—Specific requirements—Part 11: Wireless LAN Medium Access Control (MAC) and Physical Layer (PHY) specifications; Copyright © 1999 by the Institute of Electrical and Electronics Engineers, Inc.; Aug. 20, 1999 (531 pages).

(Continued)

*Primary Examiner* — Hassan Phillips
*Assistant Examiner* — Gautam Sharma

(57) ABSTRACT

A basic service set includes first and second stations and an access point (AP). An apparatus for the first station includes a controller and a transmitter. The controller is configured to, subsequent to a first delivery traffic indication message (DTIM) being transmitted by the AP, selectively provide a trigger signal that indicates a message should be transmitted by the first station to the second station via the AP. The message requests that the second station transmit a reply to the message directly to the first station. The transmitter is configured to, in response to the trigger signal, (i) enter a sleep mode until less than a predetermined period remains preceding an expected transmission of a second DTIM by the AP and (ii) transmit the message within the predetermined period. The second DTIM is transmitted by the AP subsequently to transmission of the first DTIM by the AP.

15 Claims, 4 Drawing Sheets

(56) References Cited

OTHER PUBLICATIONS

IEEE Standard for Information technology—Telecommunications and information exchange between systems—Local and metropolitan area networks—Specific requirements Part 11: Wireless Medium Access Control (MAC) and Physical Layer (PHY) specifications: Amendment 7: Medium Access Control (MAC) Quality of Service (QoS) Enhancements; Copyright © 2004 by the Institute of Electrical and Electronics Engineers, Inc.; IEEE P802.11e/D11.0, Oct. 2004 (195 pages).

IEEE Standard for Information technology—Telecommunications and information exchange between systems—Local and metropolitan area networks—Specific requirements Part 11: Wireless LAN Medium Access Control (MAC) and Physical Layer (PHY) specifications: Amendment 2: Higher-speed Physical Layer (PHY) extension in the 2.4GHz band-Corrigendum 1; Copyright © 2001 by the Institute of Electrical and Electronics Engineers, Inc.; Nov. 7, 2001 (23 pages).

Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications High-speed Physical Layer in the 5GHz Band; Copyright © 1999 by the Institute of Electrical and Electronics Engineers, Inc.; Sep. 16, 1999 (91 pages).

IEEE P802.11g/D8.2 Draft Supplement to Standard [for] Information Technology—Telecommunications and information exchange between systems13 Local and metropolitan area networks—Specific requirements—Part 11: Wireless LAN Medium Access Control (MAC) and Physical Layer (PHY) specifications:Further Higher Data Rate Extension in the 2.4 GHz Band; Copyright © 2003 by the Institute of Electrical and Electronics Engineers, Inc.; IEEE P802.11g/D8.2, Apr. 2003 (69 pages).

802.11iTM IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements; Copyright © 2004 by the Institute of Electrical and Electronics Engineers, Inc.; Jun. 24, 2004 (190 pages).

Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).

* cited by examiner

METHOD AND APPARATUS FOR DELAYING WIRELESS MESSAGE TRANSMISSION FOR SAVING POWER

CROSS-REFERENCE TO RELATED APPLICATIONS

This disclosure claims the benefit of U.S. Provisional Patent Application Ser. No. 61/382,406, filed Sep. 13, 2010, which is incorporated herein by reference.

FIELD

The present invention relates generally to data communications. More particularly, the present invention relates to tunneled direct link setup (TDLS) mechanisms for wireless local-area networks (WLAN).

BACKGROUND

Wireless local-area networks (WLAN) have become increasingly popular for communicating data between electronic devices. WLANs are frequently operated in infrastructure mode, where a wireless access point (AP) relays data between the electronic devices, which are referred to as wireless clients or stations (STA). Each communication between two STAs in infrastructure mode requires two sequential transmissions: from the sending STA to the AP, and from the AP to the receiving STA. In many cases, a direct link between the two STAs would be preferable.

Tunneled direct link setup (TDLS), which is described in IEEE 802.11e and 802.11z, provides this capability. FIG. 1 shows a conventional implementation of TDLS in an IEEE 801.11 WLAN 100. WLAN 100 includes a wireless AP 102 passing traffic between two STAs 104A,B in infrastructure mode over links 106A,B respectively. TDLS allows STAs 104A,B to establish a direct link 108.

FIG. 2 is a signaling diagram for conventional TDLS discovery in WLAN 100 of FIG. 1. In FIG. 2, time progresses from top to bottom. AP 102 transmits beacons B at a predetermined beacon interval. A common beacon interval of 100 ms is illustrated in FIG. 2. Every Nth beacon B includes a delivery traffic indication message (DTIM) D. In FIG. 2, N=2 for a DTIM interval of 200 ms. In FIG. 2, beacons containing a DTIM are shown as BD. STAs in sleep mode awaken to receive each DTIM. The DTIM informs each STA of any packets buffered at the AP and awaiting delivery to the STA. If the DTIM informs a STA that packets are waiting, the STA remains awake to receive the packets from the AP. If the DTIM informs a STA that no packets are waiting, the STA can return to sleep mode until the next DTIM.

TDLS begins when a STA (STA 104A in FIG. 2) has a TDLS trigger event T. The TDLS trigger event can be a user action, logic which determines that it is useful to have a direct link, or the like. In conventional implementations, STA 104A sends a TDLS discovery request frame 204 to AP 102 immediately after trigger event T, as shown in FIG. 1. Because STA 104B may be in sleep mode with respect to AP 102, AP 102 does not transmit the TDB discovery request frame 204 until alter the next DTIM, when STA 104B will be awake. If STA 104B does not support TDLS, it sends no response. If STA 104B supports TDLS, it sends a TDLS discovery response frame 206 directly to STA 104A (not via AP 102). If STA 104A receives a TDLS discovery response frame 206 from STA 104B, the STAs 104 can establish a direct link 108.

In either case, STA 104A must remain awake to either receive any TDLS discovery response frames 204 or determine that no TDLS discovery response frames 206 were sent. As shown in FIG. 2, the minimum awake interval for STA 104A could be longer than a DTIM interval. In FIG. 2 the DTIM interval is 200 ms, but in other implementations the DTIM interval could be much longer. This results in a large power expenditure by STA 104A. And because many STAs are battery-powered, such power expenditures are especially undesirable.

SUMMARY

In general, in one aspect, an embodiment features an apparatus for a first station (STA) in a basic service set (BSS), wherein the BSS includes the first STA, a second STA, and an access point (AP), and wherein the apparatus comprises: a controller configured to provide a trigger signal, wherein the trigger signal indicates a frame should be transmitted by the first STA to the second STA via the AP, and wherein the second STA should transmit a reply to the message directly to the first STA; and a transmitter configured to transmit the message i) responsive to the trigger signal and ii) only within a predetermined interval preceding a delivery traffic indication message (DTIM) transmitted by the AP.

In general, in one aspect, an embodiment features a method for a first station (STA) in a basic service set (BSS), wherein the BSS includes the first STA, a second STA, and an access point (AP), and wherein the method comprises: responsive to a trigger signal, wherein the trigger signal indicates a frame should be transmitted by the first STA to the second STA via the AP, and wherein the second STA should transmit a reply to the message directly to the first STA, transmitting the message only within a predetermined interval preceding a delivery traffic indication message (DTIM) transmitted by the AP.

In general, in one aspect, an embodiment features computer-readable media in a first station (STA) in a basic service set (BSS), wherein the BSS includes the first STA, a second STA, and an access point (AP), and wherein the computer-readable media embodies instructions executable by a computer to perform functions comprising: responsive to a trigger signal, wherein the trigger signal indicates a frame should be transmitted by the first STA to the second STA via the AP, and wherein the second STA should transmit a reply to the message directly to the first STA, causing the first STA to transmit the message only within a predetermined interval preceding a delivery traffic indication message (DTIM) transmitted by the AP.

The details of one or more implementations are set forth in the accompanying drawings and the description below. Other features will be apparent from the description and drawings, and from the claims.

Figure 1:
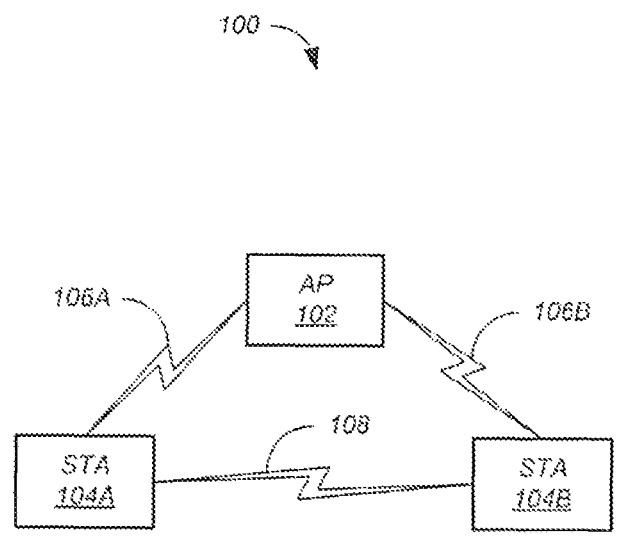
FIG. 1 shows a conventional implementation of TDLS in an IEEE 802.11 WLAN.

The leading digit(s) of each reference numeral used in this specification indicates the number of the drawing in which the reference numeral first appears.

DETAILED DESCRIPTION

Embodiments of the present disclosure provide power savings in wireless devices by delaying transmission of certain messages. Such embodiments are especially useful with messages that are transmitted via an AP and have responses that are transmitted directly between STAs. These messages include tunneled direct link setup (TDLS) frames such as peer traffic information (PTI) request frames, TDLS discovery request frames, and the like.

Figure 3:
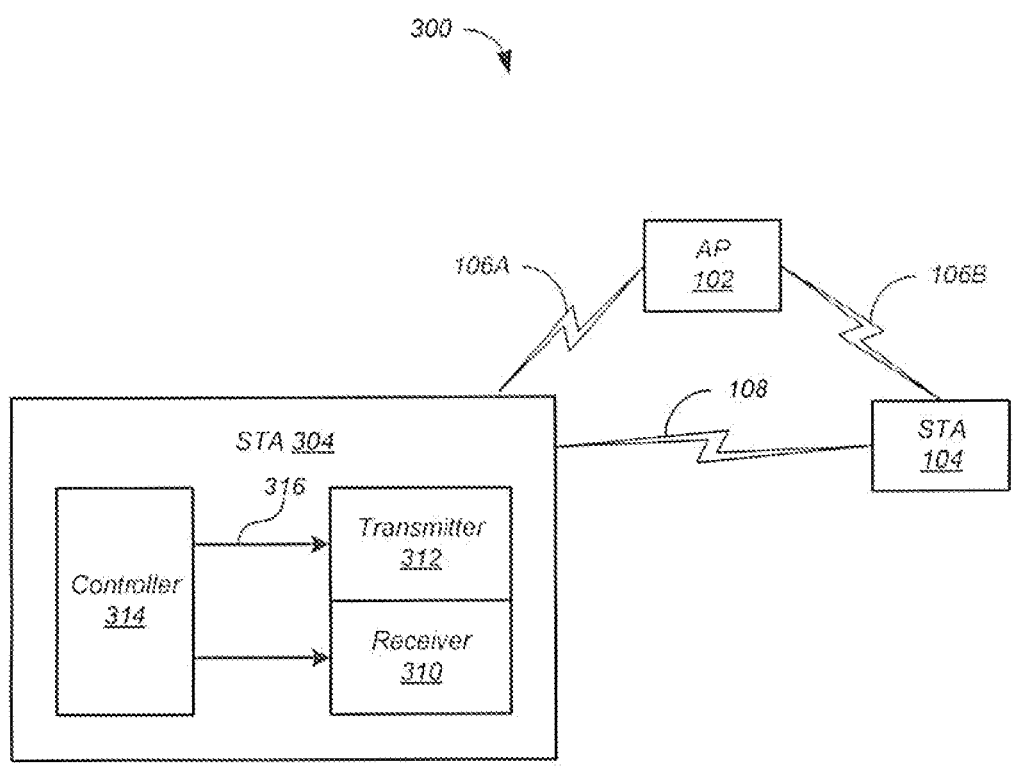
FIG. 3 shows elements of an IEEE 802.11 WLAN including a STA 304 implemented according to one embodiment.

FIG. 3 shows elements of an IEEE 802.11 WLAN 300 including a STA 304 implemented according to one embodiment. Although in the described embodiments the elements of WLAN 300 are presented in one arrangement, other embodiments may feature other arrangements. For example, elements of WLAN 300 can be implemented in hardware, software, or combinations thereof.

Referring to FIG. 3, WLAN 300 includes a conventional wireless AP 102 passing traffic in infrastructure mode over links 106A,B between a conventional STA 104 and a STA 304 implemented according to one embodiment. Also shown is a direct link 108 between STAs 104 and 304 which can be established by TDLS. STA 304 includes a receiver 310, a transmitter 312, and a controller 314. WLAN 300 in general, and STA 304 in particular, can be compliant with all or part of IEEE standard 802.11, including draft and approved amendments 802.11a, 802.11b, 802.11c, 802.11g, 802.11i, 802.11k, 802.11n, 802.11v, 802.11w, and 802.11z.

Figure 4:
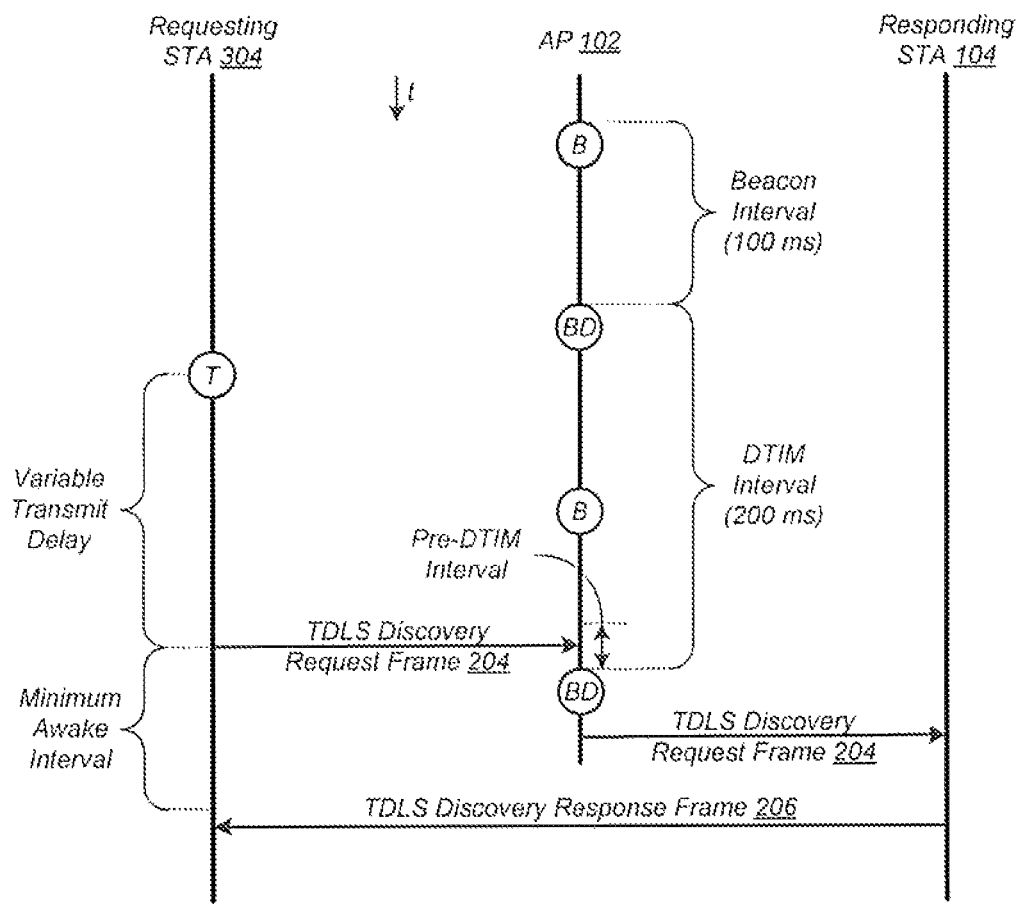
FIG. 4 is a signaling diagram for TDLS discovery in the WLAN of FIG. 3 according to one embodiment.

FIG. 4 is a signaling diagram for a TDLS discovery in WLAN 300 of FIG. 3 according to one embodiment. In FIG. 4, time progresses from top to bottom. Referring to FIGS. 3 and 4, AP 102 transmits beacons B at a predetermined beacon interval. A common beacon interval of 100 ms is illustrated in FIG. 4. Every Nth beacon B includes a delivery traffic indication message (DTIM) D. In FIG. 4, N=2 for a DTIM interval of 200 ms. In FIG. 4, beacons containing a DTIM are shown as BD. STAs 104, 304 awaken from sleep mode to receive each DTIM. The DTIM informs each STA 104, 304 of any packets buffered at AP 102 and awaiting delivery to the STA 104, 304. If the DTIM informs a STA 104, 304 that packets are waiting, that STA 104, 304 remains awake to receive the packets from AP 102. If the DTIM informs a STA 104, 304 that no packets are waiting, that STA 104, 304 can return to sleep mode until the next DTIM.

TDLS begins when a STA (STA 304 in FIG. 4) has a TDLS trigger event T. The TDLS trigger event can be a user action, logic which determines that it is useful to have a direct link, or the like. For example, the logic could use some traffic threshold to determine whether a direct link should be formed to a peer or not. The logic can be implemented so as to make the link transition transparent to user. For example, referring to FIG. 3, controller 314 provides a trigger signal 316, where the trigger signal indicates a TDLS discovery request frame 204 should be transmitted by STA 304 to STA 104 via AP 102. According to TDLS, STA 104 should respond by transmitting a TDLS discovery response frame 206 directly to the STA 304.

Figure 2:
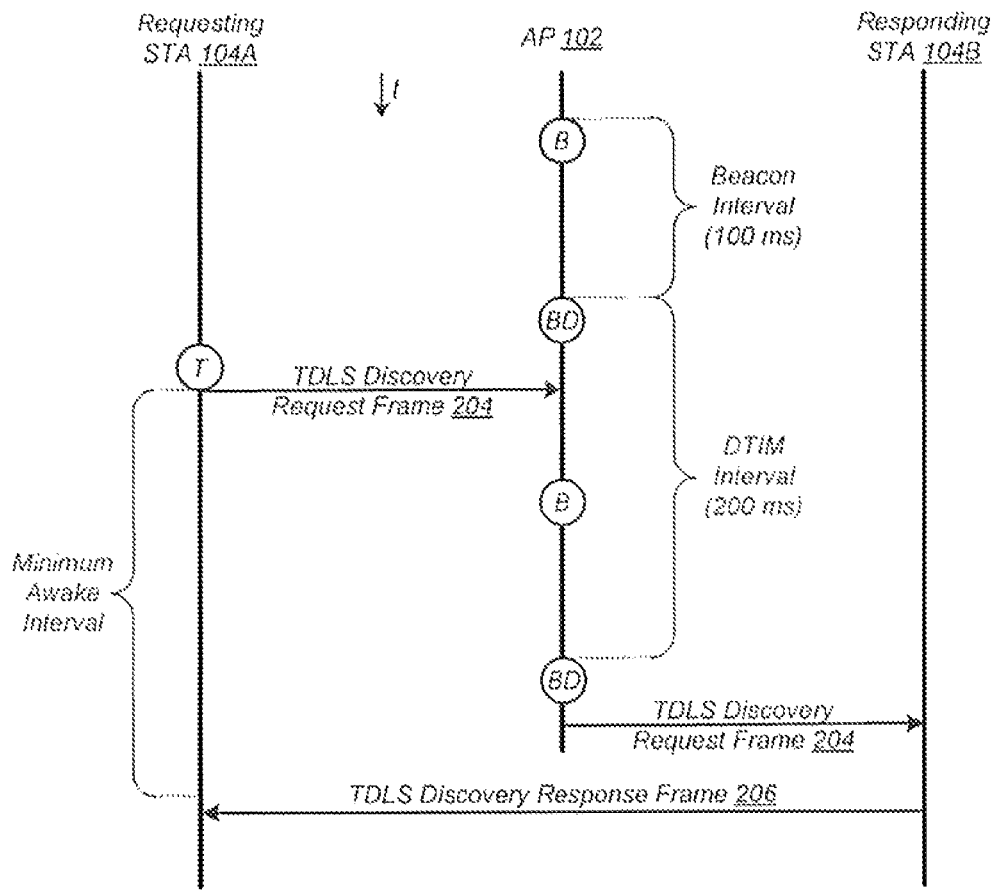
FIG. 2 is a signaling diagram for conventional TDLS discovery in WLAN of FIG. 1.

In conventional implementations, the STA 304 would transmit a TDLS discovery request frame 204 to AP 102 immediately in response to trigger signal 316. As described above with reference to FIGS. 1 and 2, this would result in a minimum awake interval for the STA 304 that could be longer than a DTIM interval. In contrast, the described embodiments reduce this minimum awake interval significantly by controlling the transmission time of TDLS discovery request frame 204. In particular, referring to FIG. 4, STA 304 implements a variable transmit delay before transmitting TDLS discovery request frame 204. For example, STA 304 awakes from sleep mode, and transmitter 312 of STA 304 transmits the TDLS discovery request frame 204, only within a predetermined interval (pre-DTIM interval) preceding a DTIM transmitted by AP 102. The duration of the pre-DTIM interval can be selected in any manner, for example based on channel conditions, the discovery request frame time, which is dependent on the rate at which the frame is sent, and the like. For example, in one embodiment the duration of the pre-DTIM interval is 1 ms. AP 102 uses the DTIM to inform STA 104 of the presence of the TDLS discovery request frame 204, and then forwards the TDLS discovery request frame 204 to STA 104.

STA 104 either responds immediately, by sending a TDLS discovery response frame 206 directly to STA 304, or does not respond. If STA 104 supports TDLS, it sends a TDLS discovery response frame 204 directly to STA 304 (not via AP 102). If STA 304 receives a TDLS discovery response frame 206 from STA 104, the STAs 304, 104 can establish a direct link 108. In either case, STA 304 experiences a shorter minimum awake interval than in conventional approaches.

The described techniques can reduce the average awake time, while waiting for discovery response, for the sender of discovery request by half a DTIM interval. For example, in the typical case the STA 104 collects a TDLS discovery request frame 204 from AP 102 only after the next DTIM. In conventional approaches, the TDLS discovery request frame 204 could be randomly generated by the STA 104 anytime during a DTIM. Taking a long term average results in a waiting time of half a DTIM interval for the TDLS discovery request frame 204 to reach STA 104. In the described embodiments, the TDLS discovery request frame 204 is sent near the DTIM and so quickly reaches STA 104. The result is negligible wait time for STA 304. Therefore the average awake time for STA 304 is reduced by close to half a DTIM interval.

A new mechanism FMS (flexible multicast service) has been introduced in IEEE 802.11v. FMS allows a STA to request the AP send group-addressed traffic only every Nth DTIM interval where N>1, thus allowing the STA to remain in sleep mode longer. A STA can use the FMS DTIM schedule to schedule transmission of messages such as TDLS messages.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. An apparatus for a first station (STA) in a basic service set (BSS), wherein the BSS includes the first STA, a second STA, and an access point (AP), the apparatus comprising:
 a controller configured to, subsequent to a first delivery traffic indication message (DTIM) being transmitted by the AP, selectively provide a trigger signal, wherein the trigger signal indicates a message should be transmitted by the first STA to the second STA via the AP, wherein the message includes a tunneled direct link (TDL) frame, and wherein the message requests that the second STA transmit a reply to the message directly to the first STA; and
 a transmitter configured to, in response to the trigger signal, (i) enter a sleep mode until less than a predetermined period remains preceding an expected transmission of a second DTIM by the AP and (ii) transmit the message within the predetermined period preceding the expected transmission of the second DTIM,
 wherein the second DTIM is transmitted by the AP subsequently to transmission of the first DTIM by the AP, and
 wherein no intervening DTIMs are transmitted by the AP between the first DTIM and the second DTIM.

2. The apparatus of claim 1, wherein:
 the TDL frame is a peer traffic information (PTI) frame.

3. The apparatus of claim 1, wherein:
 the TDL frame is a tunneled direct link setup (TDLS) discovery request frame.

4. The apparatus of claim 3, wherein the reply from the second STA comprises:
 a TDLS discovery response frame.

5. The apparatus of claim 1, wherein the apparatus is compliant with IEEE standard 802.11, including one or more of draft and approved amendments 802.11a, 802.11b, 802.11e, 802.11g, 802.11i, 802.11k, 802.11n, 802.11v, 802.11w, and 802.11z.

6. A method for a first station (STA) in a basic service set (BSS), wherein the BSS includes the first STA, a second STA, and an access point (AP), the method comprising:
 subsequent to a first delivery traffic indication message (DTIM) being transmitted by the AP, determining whether to transmit a message from the first STA to the second STA via the AP, wherein the message includes a tunneled direct link (TDL) frame, and wherein the message requests that the second STA transmit a reply to the message directly to the first STA; and
 in response to determining to transmit the message,
  placing the first STA into a sleep mode until less than a predetermined period remains prior to expected transmission of a second DTIM by the AP, and
  transmitting the message to the AP during the predetermined period,
 wherein the second DTIM is transmitted by the AP subsequently to transmission of the first DTIM by the AP, and
 wherein no intervening DTIMs are transmitted by the AP between the first DTIM and the second DTIM.

7. The method of claim 6, wherein:
 the TDL frame is a peer traffic information (PTI) frame.

8. The method of claim 6, wherein:
 the TDL frame is a tunneled direct link setup (TDLS) discovery request frame.

9. The method of claim 8, wherein the reply from the second STA comprises:
 a TDLS discovery response frame.

10. The method of claim 6, wherein the method is compliant with IEEE standard 802.11, including one or more of draft and approved amendments 802.11a, 802.11b, 802.11e, 802.11g, 802.11i, 802.11k, 802.11n, 802.11v, 802.11w, and 802.11z.

11. In a first station (STA) in a basic service set (BSS), wherein the BSS includes the first STA, a second STA, and an access point (AP), a non-transitory computer-readable medium embodying instructions executable by a computer to perform functions comprising:
 subsequent to a first delivery traffic indication message (DTIM) being transmitted by the AP, determining whether to transmit a message from the first STA to the second STA via the AP, wherein the message includes a tunneled direct link (TDL) frame, and wherein the message requests that the second STA transmit a reply to the message directly to the first STA; and
 in response to determining to transmit the message, causing the first STA to
  enter a sleep mode until less than a predetermined period remains prior to expected transmission of a second DTIM by the AP, and
  transmit the message to the AP during the predetermined period prior to the expected transmission of the second DTIM,
 wherein the second DTIM is transmitted by the AP subsequently to transmission of the first DTIM by the AP, and
 wherein no intervening DTIMs are transmitted by the AP between the first DTIM and the second DTIM.

12. The computer-readable medium of claim 11, wherein:
 the TDL frame is a peer traffic information (PTI) frame.

13. The computer-readable medium of claim 11, wherein:
 the TDL frame is a tunneled direct link setup (TDLS) discovery request frame.

14. The computer-readable medium of claim 13, wherein the reply from the second STA comprises:
 a TDLS discovery response frame.

15. The computer-readable medium of claim 11, wherein the functions are compliant with IEEE standard 802.11, including one or more of draft and approved amendments 802.11a, 802.11b, 802.11e, 802.11g, 802.11i, 802.11k, 802.11n, 802.11v, 802.11w, and 802.11z.

* * * * *